US012002339B2

(12) United States Patent
Mann et al.

(10) Patent No.: US 12,002,339 B2
(45) Date of Patent: Jun. 4, 2024

(54) SYSTEMS AND METHODS FOR TRACKING LOCATION

(71) Applicant: J Mann 8, LLC, Auburn, AL (US)

(72) Inventors: Johnny Mann, Auburn, AL (US); Steffen Sullivan, Auburn, AL (US)

(73) Assignee: J Mann 8, LLC, Auburn, AL (US)

( * ) Notice: Subject to any disclaimer, the term of this patent is extended or adjusted under 35 U.S.C. 154(b) by 0 days.

(21) Appl. No.: 17/679,963

(22) Filed: Feb. 24, 2022

(65) Prior Publication Data

US 2022/0270458 A1 Aug. 25, 2022

Related U.S. Application Data

(60) Provisional application No. 63/153,058, filed on Feb. 24, 2021.

(51) Int. Cl.
*G08B 13/24* (2006.01)

(52) U.S. Cl.
CPC ................................ *G08B 13/2462* (2013.01)

(58) Field of Classification Search
CPC ................................................ G08B 13/2462
See application file for complete search history.

(56) References Cited

U.S. PATENT DOCUMENTS

2014/0358574 A1* 12/2014 Tara ...................... G06Q 10/06 705/2
2017/0092090 A1* 3/2017 Lerner ............... G08B 13/2462
2017/0131383 A1 5/2017 Bartov et al.
2018/0067191 A1 3/2018 Hamilton
2018/0262903 A1* 9/2018 Ryan ...................... H04W 4/90
2019/0180060 A1 6/2019 Mountz
2020/0228943 A1 7/2020 Martin et al.
2020/0287590 A1* 9/2020 Torborg ............... H04B 1/7183

OTHER PUBLICATIONS

International Search Report dated Jun. 1, 2022 of corresponding International Patent Application No. PCT/US2022/017740.

* cited by examiner

*Primary Examiner* — Travis R Hunnings
(74) *Attorney, Agent, or Firm* — Bradley Arant Boult Cummings LLP; Rudy Hill; Jessica L. Zurlo

(57) ABSTRACT

Systems and methods for tracking locations of movable assets within a space are disclosed. The systems include at least one tag configured for attachment to at least one movable asset and a plurality of anchors configured for measuring location data of the tag within the space. The tag and the anchors each include a transceiver module operable to measure location using, for example, ultrawide band or the global positioning system (GPS). The systems further include a listener in wireless communication with a communications portal or a mobile application on a mobile device, the listener is configured to receive location data from the tag and anchors and to transmit the location data to the communications portal or the mobile application. The systems also allow a user to create barriers for each of the tags within the space and alert the user when a tag moves beyond a barrier.

13 Claims, 3 Drawing Sheets

SYSTEMS AND METHODS FOR TRACKING LOCATION

FIELD OF THE DISCLOSURE

The present disclosure relates generally to systems and methods for monitoring location, and more specifically to systems and methods for tracking the location of an asset and communicating the location of the asset to a user.

BACKGROUND

Electronic tracking devices have created numerous ways for people to track the locations of people and/or objects. For example, a user can use GPS technology to track a device remotely or determine a location of the user. A user can also attach a tracking device to an object, such as keys or a wallet, and use the features of the tracking device to locate the object if the object is lost. However, these traditional tracking devices present challenges and disadvantages. For example, locating a tracking device from a far distance requires a considerable amount of power. Thus, battery life of a tracking device is often limited. Moreover, technology for long-range tracking is expensive, and often requires sophisticated circuitry.

Accordingly, there remains a need in the art for an efficiently operated location tracking system that can track the location of objects from far distances and display the locations in a user-friendly format. There is also a need in the art for a location tracking system that allows a user to create specific boundaries for the objects being tracked and that can notify the user when the objects enter or exit the boundaries.

SUMMARY

Systems and methods for tracking location of an asset are disclosed. In some embodiments, the systems of the present disclosure include a tag configured for attachment to a movable asset, a plurality of anchors configured for measuring location data of the tag, where the tag and the anchors each include a transceiver module operable to measure location using ultrawide band (UWB), and a listener in communication with a communications portal, where the listener is configured to receive incoming location data from the anchors and tags and to transmit the location data to the communications portal. The communications portal may include software for organizing the location data and a screen for displaying the location data to a user. In other embodiments, the communications portal may include software for creating virtual barriers to restrict access of the tag to certain spaces. In this embodiment, the system may include a chip configured for attachment to the tag, the chip further configured to send an alert to the user or to otherwise alert the asset when the tag moves beyond the virtual barrier. In still other embodiments, the anchors are configured to measure location data of the tag based on a time interval, for example, a time interval ranging from ten times per second to once per second. In further embodiments, the communications portal may be in wireless communication with a mobile application running on a mobile device of the user.

In other embodiments, a system for tracking location of a movable asset within a space is provided, the system including a tag configured for attachment to the movable asset; a plurality of anchors configured for measuring location data of the tag within the space, wherein the tag and the anchors each include at least one of a transceiver module operable to measure location using ultrawide band (UWB) or a transceiver module operable to measure location using global positioning system (GPS); and a listener in wireless communication with a mobile application running on a mobile device of the user, the listener configured to receive location data from the tag and the anchors and to transmit the location data to the mobile application. In some embodiments, the anchors are configured to measure the location data of the tag based on a time interval, for example, from ten times per second to once per second. In further embodiments, the tag and the anchors each include both the transceiver module operable to measure location using UWB and the transceiver module operable to measure location using GPS. In still further embodiments, the mobile application includes software for creating a virtual barrier within the space. In yet further embodiments, the mobile application is incorporated with augmented reality (AR) capabilities configured to perform three-dimensional recognition of the space in which the virtual barrier is to be created.

In still other embodiments, a method for tracking the location of a movable asset within a space is provided, the method including providing a tag configured for attachment to the movable asset and a plurality of anchors configured for measuring location data of the tag within the space, wherein the tag and the anchors each include at least one of a transceiver module operable to measure location using ultrawide band (UWB) or a transceiver module operable to measure location using global positioning system (GPS); measuring the location data of the tag using at least one of the transceiver modules; communicating the measured location data of the tag to a listener, wherein the listener is configured to transmit the measured location data to a mobile application running on a mobile device of the user; and displaying the measured location data of the tag on the mobile application. In some embodiments, the method may further include creating a virtual barrier for the tag. The virtual barrier may be created by positioning the tag and the user's mobile device at a point along the virtual barrier and inputting the position into the mobile application. In further embodiments, the method may further include detecting movement of the tag beyond the virtual barrier and sending an alert to the user's mobile device. In still further embodiments, the step of measuring further includes communicating a location of one anchor to another anchor and to the listener such that the plurality of anchors establish a grid pattern having x, y, and z coordinates over the space.

BRIEF DESCRIPTION OF THE DRAWINGS

Further features and advantages can be ascertained from the following detailed description that is provided in connection with the drawings described below.

DETAILED DESCRIPTION

Figure 1:
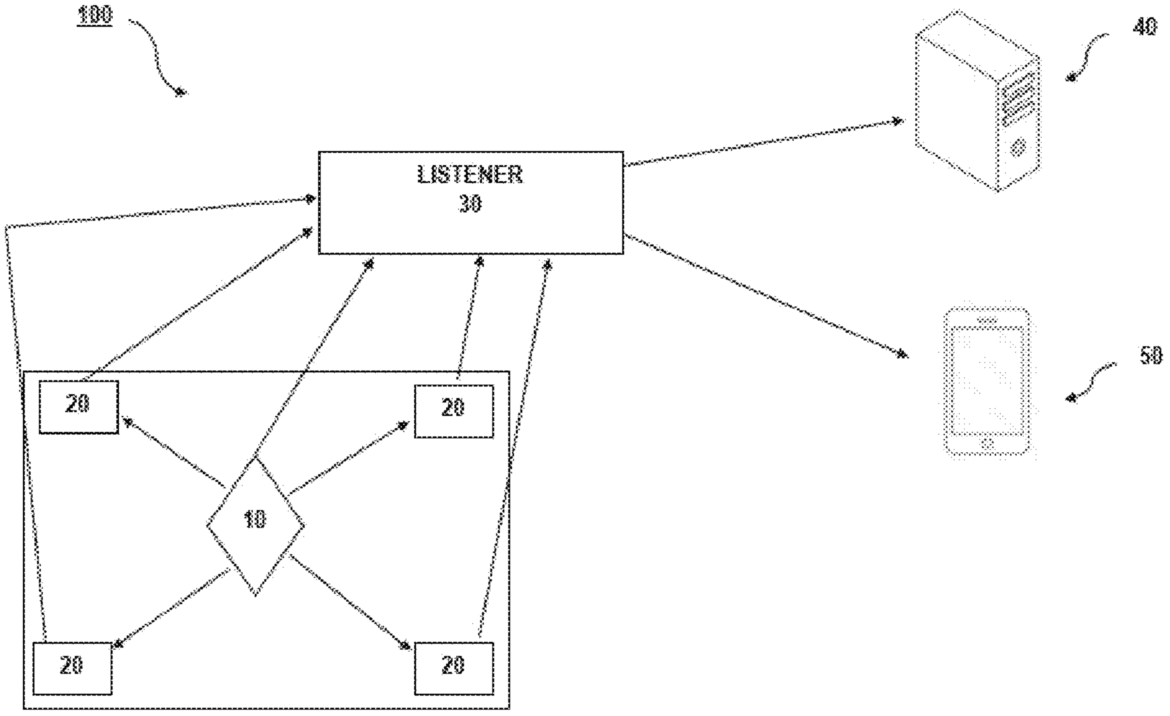
FIG. 1 is a schematic diagram of a system for tracking location according to an exemplary embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The present disclosure relates generally to systems and methods for tracking the location of assets in real time and communicating the locations to a central hub that organizes and displays the information. In one embodiment, the system of the present disclosure includes at least one tag, a plurality of anchors, at least one listener, a communications portal, and a mobile application running on a user's mobile device. The tag is attached to a movable asset for which the location is to be tracked and monitored. An asset, as used herein, may include, but is not limited to, humans, pets, farm animals, inanimate objects, such as vehicles and electronic devices, or anything having a physical location that may be monitored with a location tracking system. The anchors act as a location detector and are operative to determine the location of each of the tags. In one embodiment, the system of the present disclosure includes at least three anchors for determining the location of each of the tags. In another embodiment, the system of the present disclosure includes at least four anchors for determining the location of each of the tags. In still another embodiment, the system of the present disclosure includes at least five anchors for determining the location of each of the tags.

The listener receives information, such as location data, from the anchors and tags and communicates the information to a communications portal and/or a mobile application on a mobile device. The communications portal and/or the mobile application displays the location of the tags in real time so that a user can track and monitor the movement of the assets. The systems of the present disclosure determine location more quickly, are more accurate, and more cost effective than systems previously disclosed. The systems of the present disclosure can also be integrated with other smart home devices, such as smart security systems, cameras, appliances, speakers, displays, and the like.

FIG. 1 is a schematic diagram of a system 100 for tracking location according to an exemplary embodiment of the present disclosure. In one embodiment, the system 100 of the present disclosure includes a plurality of tags 10 and anchors 20. A tag 10 is attached to each asset for which the location is to be tracked and monitored. For example, the tags 10 may be attached to assets that are actively moving within a defined area. The anchors 20 are operable to measure the location of the tags 10 and define the boundaries of the overall area. In this embodiment, each of the anchors 20 and tags 10 includes a transceiver module operable to measure the location of assets in real time. Each transceiver module on the tag 10 allows for the location of the asset it is attached thereto to be tracked. In some embodiments, the transceiver modules measure location using ultrawide band (UWB). UWB is a short-range, wireless communication protocol that operates through radio waves and can be used to capture highly accurate spatial and directional data. In one embodiment, the transceiver module is a Decawave DWM1001 module that operates using UWB technology.

In some embodiments, the transceiver modules may measure location using global positioning system (GPS). GPS uses wireless signals transmitted by earth-orbiting satellites to calculate the position of a receiving device. In this embodiment, the transceiver module is comprised of a GPS receiver, such as a GPS chip or tag. The GPS receiver may include a subscriber information module (SIM) card to allow the GPS receiver to communicate with a user's mobile device. The term "mobile device," as used herein, refers to cell phones, tablets, laptops, handheld PCs, personal digital assistants (PDAs), and other mobile handheld communication devices. For example, the SIM card within the GPS receiver may be used with a cellular data plan to communicate the location of the tag 10 or anchor 20 to the user's mobile device. The transceiver modules using GPS technology may be particularly useful for when the tag 10 or anchor 20 are moved out of range of a UWB network. While the use of UWB and GPS have been exemplified herein, any other short-range communication systems that are readily known to a person of ordinary skill in the art may be utilized with the present system. For example, the tags and anchors may use Bluetooth to communicate with the communications portal and with each other.

Each of the tags 10 and anchors 20 may include more than one transceiver module. For example, a tag 10 may include a transceiver module that operates using UWB technology and a transceiver module that operates using GPS technology. In this embodiment, the location of the tag 10 may be determined using UWB or GPS technology. This is particularly advantageous for a tag that may move between indoor and outdoor locations. The transceiver module operating with UWB technology may be particularly suitable for determining the location of the tag when it is located indoors, while the transceiver module operating with GPS technology may be particularly suitable for determining the location of the tag when it is located outdoors. In other embodiments, the tags 10 and anchors 20 may include more than one transceiver module of the same type. For instance, a tag 10 may include two transceiver modules that both determine location using UWB technology or two transceiver modules that both determine location using GPS technology. Any number of transceiver modules may be used with a tag or anchor.

The transceiver modules may each be housed in a casing that is easily attachable to the anchors 20 and the tags 10. For example, the casing may be attached to the anchors 20 and the tags 10 by clips, magnets, hook and loop fasteners, snap fasteners, adhesives, or pressure fit connections. In some embodiments, the tag 10 and/or the anchor 20 may have the transceiver modules attached thereto in a collar that can be worn by the asset that is to be tracked. In some embodiments, the transceiver modules on the tags 10 and anchors 20 may be powered by a rechargeable power source, such as a rechargeable battery. In other embodiments, the transceiver modules may be powered by a wall outlet. For instance, since the anchors are generally stationary, the transceiver modules on the anchors can be powered by plugging them into a wall outlet.

Each of the anchors 20 have a known location. The anchors 20 may be placed at discrete locations within a defined area in proximity to the tags to be tracked. For instance, if the tags to be tracked are located within a building, an anchor 20 may be located in each room of the building or every other room of the building. If the tags to be tracked are located in a single room, an anchor 20 may be located in each corner. In one embodiment, the anchors 20 are arranged in a geometric shape within the defined area. For example, the anchors 20 may be arranged in a triangular shape within the defined area. In other embodiments, the anchors 20 may be arranged in a rectangular shape within the defined area. In some embodiments, the anchors 20 are capable of communicating at least two rooms apart without any loss of speed or accuracy. In other embodiments, the anchors 20 are capable of communicating at least four rooms apart without any loss of speed or accuracy. In still other embodiments, the anchors 20 are capable of communicating with one another at distances of up to about 45 meters if the anchors are all in line of sight. In yet other embodiments, the anchors 20 are capable of communicating with one another at distances of up to about 60 meters if the anchors are all in line of sight. As will be readily apparent to one of ordinary skill in the art, the number and positioning of the anchors 20 will vary depending on the number of tags 10 to be tracked and the size and other characteristics of the area within which the tags 10 are to be tracked.

When the anchors 20 are positioned in discrete locations in proximity to the tags 10 to be tracked, the anchors 20 can communicate their locations with each other using the attached transceiver modules. The anchors 20 can also communicate their locations to a listener 30. In one embodiment, the listener 30 includes a transceiver module, as described above, that allows the listener 30 to receive incoming location data from the anchors and tags. By communicating their locations to each other and to the listener 30, the anchors 20 establish a grid pattern having x, y, and z coordinates over a defined area within which the tags 10 are to be tracked. For example, the grid pattern is established by positioning a first anchor having known coordinates (0, 0, 0). A second anchor is positioned and the relative distance between the first anchor and the second anchor is measured. The relative distance between the first anchor and the second anchor is used to set the coordinates of the second anchor. For instance, if the second anchor is located three meters to the left, four meters in front, and two meters above the first anchor, then the user would set the coordinates of the second anchor at (3, 4, 2). A measuring tool may be used to allow the user to easily measure these distances. The same steps can be performed for the other anchors in the system. In some embodiments, the anchors 20 may be operable to determine and set the coordinates on their own.

The surrounding tags 10 can read the information from the locations of the anchors 20 and use the grid pattern to triangulate their locations. For example, the tags can triangulate their locations into x, y, and z coordinates. The tags 10 can then communicate their locations to the listener 30, which is operable to receive the incoming location data from each tag 10.

As the tags 10 move within the defined area, the tags 10 can continually update their locations and send the updated location information to the listener 30. In some embodiments, the listener 30 may send a command to receive the locations of all or some of the tags 10. The tags 10 can update their locations based on a time interval. For instance, the tags 10 may update the listener 30 up to ten times per second. In another embodiment, the tags 10 may update the listener 30 up to five times per second. In still another embodiment, the tags 10 may update the listener 30 every second. In yet another embodiment, the tags 10 may update the listener 30 every minute.

In some embodiments, once the location data of the tags 10 is received by the listener 30, the listener 30 may then transmit the location data to a communications portal 40. In other embodiments, once the location data of the tags 10 is received by the listener 30, the listener 30 may transmit the location data to a mobile application 50 running on the user's mobile device. The communications portal 40 or the mobile application 50 organizes the location data received by the listener 30 and displays the location data on a user-friendly interface. The listener 30 may be in wireless communication with the communications portal 40 or the mobile application 50 (for example, through a Wi-Fi connection). In another embodiment, the listener 30 may be connected to and in communication with the communications portal 40 or the user's mobile device (for instance, through a wired connection). In one embodiment, the communications portal 40 and the mobile application 50 may be comprised of software for processing and organizing the incoming location data. In some embodiments, the communications portal 40 may include a computer system.

Figure 2:
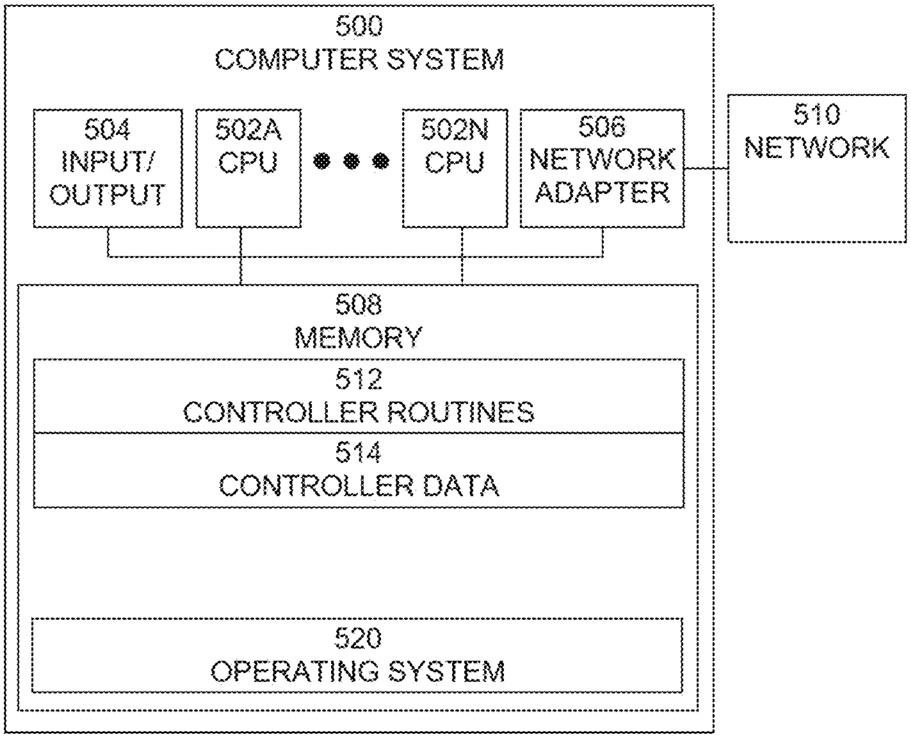
FIG. 2 is a schematic diagram of a computer system for a communications portal according to one embodiment of the present disclosure.

FIG. 2 is a schematic diagram of a computer system 500 according to one embodiment of the present disclosure. Computer system 500 may typically be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions to carry out the functions of the present systems and methods. Typically, CPUs 502A-502N are one or more microprocessors, such as an INTEL CORE® processor.

Input/output circuitry 504 provides the capability to input data to, or output data from, computer system 500. For example, input/output circuitry 504 may include input devices, such as a graphical user interface, keyboards, mice, touchpads, trackballs, scanners, and analog to digital converters; output devices, such as video adapters, monitors, and printers; and input/output devices, such as modems.

In some embodiments, the input/output circuitry 504 may include a display screen. The display screen is configured to show the location of all of the tags 10 being tracked. The display screen can also be configured to show any barriers that have been made (as will be described in more detail below). In one embodiment, the display screen may be connected to and in communication with the communications portal 40 and the listener 30 through external hard wiring or other circuitry. In other embodiments, the display screen may be located entirely separate from the listener 30 and the communications portal 40. For example, the display screen and graphical user interface incorporated therein may be integrated on the mobile application 50 that is in wireless communication with the computer system 500 and/or the listener 30 (for example, through a Wi-Fi connection). In this embodiment, the incoming information, such as the location of the tags and/or anchors, may be collected by the listener 30 and sent to a server where the information is distributed to (and displayed on) the mobile application 50 on the user's mobile device.

In one embodiment, the display screen may include a touch screen display incorporating a graphical user interface. In another embodiment, the display screen may be an electroluminescent (ELD) display, liquid crystal display (LCD), light emitting diode (LED) display (e.g., organic light emitting diode (OLED) or microLED), plasma display panel (PDP), or quantum dot (QLED) display operatively connected to an external input device, such as a keyboard or touch pad.

Network adapter 506 interfaces computer system 500 with a network 510. Network 510 may be any public or proprietary data network, such as LAN and/or WAN (for example, the Internet). Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), and flash memory, and electro-mechanical memory, which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, or Serial Advanced Technology Attachment (SATA), or a variation or enhancement thereof, or a fiber channel-arbitrated loop (FC-AL) interface.

Memory 508 may include controller routines 512, controller data 514, and operating system 520. Controller routines 512 may include software routines to perform processing to implement one or more controllers. Controller data 514 may include data needed by controller routines 512 to perform processing. In one embodiment, controller routines 512 may include software for analyzing and communicating incoming data from the listener 30 (for example, incoming location data from the tags). In another embodiment, controller routines 512 may include software for analyzing and communicating incoming data from the anchors 20 (for example, incoming location data from the anchors). The controller routines 512 may also be incorporated into the mobile application 50 running on the user's mobile device.

In addition to displaying the location of all the tags being tracked, the communications portal 40 and/or the mobile application 50 can be used to create and display virtual barriers. A virtual barrier, as used herein, refers to an invisible boundary around a defined area. A virtual barrier can be created to confine the tags 10 to certain defined areas. In other embodiments, a virtual barrier can be created to prevent the tags 10 from entering or accessing certain defined areas. A user may create a barrier by identifying a plurality of locations along the desired boundary of the barrier. Each of these locations may be referred to as a barrier point. A virtual barrier around a defined area can be created by setting at least three barrier points. In other embodiments, it may be advantageous to set at least five barrier points to create a virtual barrier. In still other embodiments, it may be advantageous to set at least seven barrier points to create a virtual barrier. Generally, the more barrier points that have been set, the more accurate the barrier can be defined.

The virtual barriers may be created using various methods. In some embodiments, the virtual barriers may be created using software on the computer system 500. For example, controller routines 512 may include software for processing commands for creating one or more barriers. The virtual barriers may be created by inputting the desired barrier points into the graphical user interface on the display screen operatively connected to the computer system 500 and the listener 30. Using the graphical user interface, the user may hold the tag 10 in a location on the grid pattern where the user desires to set a barrier point. This location can then be saved as a barrier point.

In other embodiments, the virtual barriers may be created by inputting the barrier points into the mobile application 50 on the user's mobile device, like a smart phone or tablet, such that the application 50 is in wireless communication with the computer system 500 and/or the listener 30 (for example, through a Wi-Fi connection). A user may input the barrier points into the application 50 by physically positioning the user's mobile device, in conjunction with a tag 10 so that the physical location of the tag and the mobile device can be communicated to the application, at desired barrier points along the virtual barrier. For instance, if a user would like to create a rectangular virtual barrier around a specific stationary item, the user can walk the mobile device with the application running and the accompanying tag along the desired virtual barrier and input a barrier point at each corner of the rectangular shape to form the rectangular virtual barrier. In some embodiments, if the virtual barrier to be created is outdoors, it may be advantageous to use the application and a tag having a transceiver module with GPS capabilities. The use of GPS is particularly suitable for creating barriers that are located outside of the UWB network, such as outdoors in a yard, driveway, field, or other outdoor locations. The GPS technology can communicate the location of the tag to the application in order to create the virtual barrier. In still other embodiments, a user may input the barrier points of the virtual barrier into the application without the use of a tag. For example, the application running on the user's mobile device may use the GPS capabilities incorporated within the mobile device to communicate the desired barrier points along the virtual barrier.

In further embodiments, the application 50 on the user's mobile device may be incorporated with augmented reality (AR) capabilities. The AR capabilities may allow the application to perform three-dimensional recognition of the environment in which a virtual barrier is to be created. Once the AR application has created a three-dimensional map of the environment, the application may use simple visual cues and voice prompts to direct and/or instruct the user to create a virtual barrier. This information may be visually observable information projected directly into the environment to guide a user through creating the virtual barrier. This may include, for example, text, icons, symbols, arrows, circles, shapes, points, and any other desired visual cue. In some embodiments, each anchor 20 may include a visual aid, such as a QR code or indicator light, that is capable of registering the location of the anchor 20 with the application 50. In this embodiment, using the AR capabilities on the application, a user may point the mobile device at each anchor 20 such that the visual aid registers the location of the anchor 20 on the application 50 to set the location of various barrier points.

In still other embodiments, the virtual barriers may be created using a drawing accessory compatible with the display screen or the application 50 on the user's mobile device. The drawing accessory allows a user to draw barriers directly on the display screen or the screen of the mobile device. In another embodiment, the barriers may be created using a wand that allows a user to input a boundary point of the barrier by physically positioning the wand in the desired location of the boundary point. In this embodiment, the wand is operatively connected to the computer system 500 or the application 50 on the mobile device and may include a tag 10 so that the location of the wand can be communicated to the computer system 500 or the application 50. A user can physically position the wand at each desired boundary point and enter the boundary points into the system to create the shape or perimeter of the desired barrier. In a preferred embodiment, the functionalities of the drawing accessory and the wand can be accomplished by the same device. In some embodiments, the wand may be used to create the virtual barrier without the use of a tag. For example, the application 50 running on the user's mobile device may use the GPS capabilities incorporated within the mobile device to communicate the location of the wand (and the subsequent desired barrier points).

A user may create more than one barrier within the same grid pattern. For instance, a user may create multiple barriers within the same grid pattern to confine the tags 10 to certain areas or to prevent the tags 10 from entering or accessing certain areas. The different barriers can be visualized on the display screen or the application 50 and can be labeled to keep the barriers organized. The user may also select which tags 10 are linked to the different barriers. For instance, multiple tags may share one or more barriers. In other embodiments, each tag 10 may have its own barrier. This also prevents the barriers assigned to one tag from interfering with barriers assigned to another tag.

The system of the present disclosure may also incorporate notifications configured to alert the user when a tag 10 crosses into or outside of a virtual barrier (for example, if a tag leaves a confined area or accesses a restricted area). In one embodiment, the notification can be incorporated into the graphical user interface on the display screen or on the application 50. For example, a visual alert may appear on the graphical user interface when a tag 10 is detected to have crossed into or out of a virtual barrier. In another embodiment, the notification can be incorporated into hardware attached to the tag 10 itself. For instance, a chip may be embedded into a wristband or collar attached to the tag 10 and may be configured to vibrate or sound an alarm when the tag 10 is detected to have crossed into or out of a virtual barrier.

Figure 3:
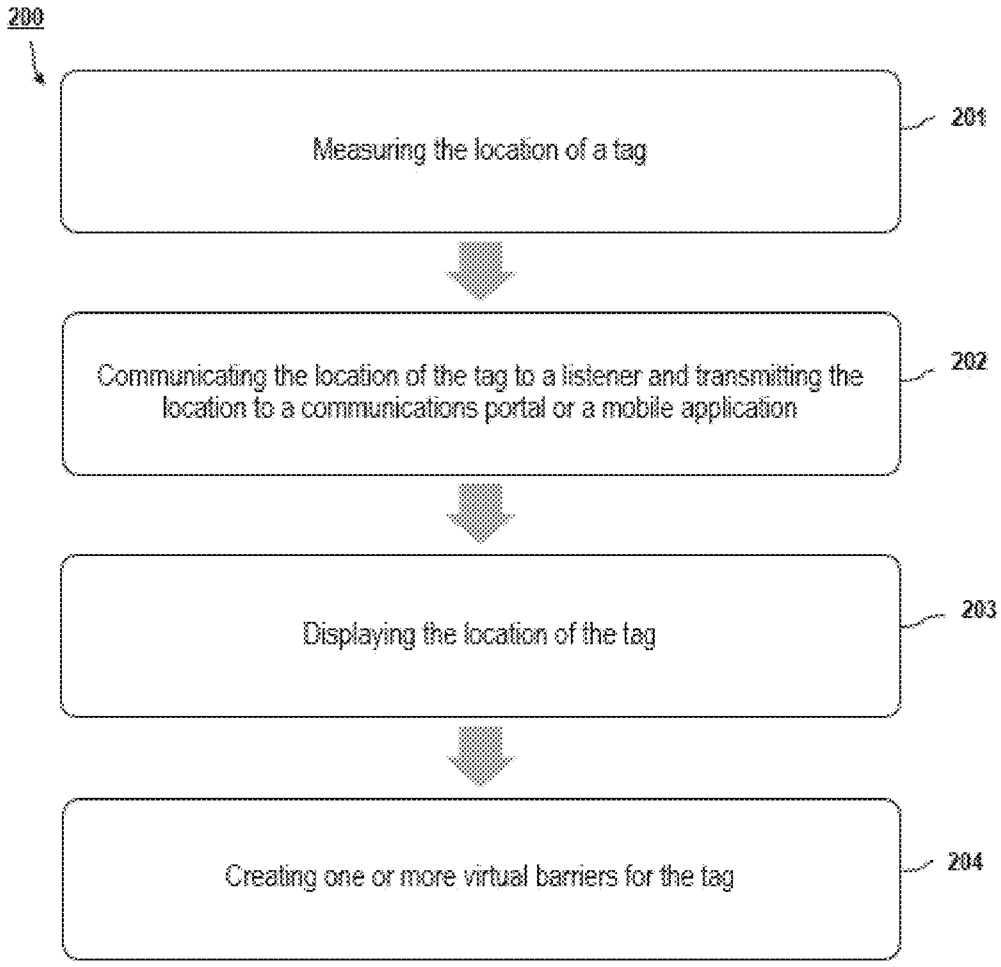
FIG. 3 is a flowchart showing the steps of a method for tracking location according to an exemplary embodiment of the present disclosure.

The present disclosure also provides methods for tracking the location of an asset using the system described herein. FIG. 3 is a flowchart showing the steps of a method 200 for tracking location according to an exemplary embodiment of the present disclosure. In one embodiment, the method includes measuring the location of each of the tags using the transceiver modules on the anchors and the tags (step 201), communicating the location of each of the tags to a listener that is configured to transmit the location data to the communications portal or the mobile application running on the user's mobile device (step 202), and displaying the location of each of the tags on a display screen (step 203). In some embodiments, the method may further include creating one or more barriers for the tags (step 204). In this embodiment, the method may further include detecting movement of the tags beyond the created barrier(s) and sending an alert to the user. The virtual barrier may be created by any of the methods described above. In some embodiments, the virtual barrier may be created by positioning the tag(s) and the user's mobile device at a point along the virtual barrier and inputting the position into the mobile application.

The systems and methods described herein may be used to track the movement and location of any type of asset within a defined area. As one example, the systems and methods may be used to track the movement and location of pets or farm animals. Barriers may be set to limit the areas in which the animals can roam (for example, barriers can be set to keep pets from getting onto furniture or entering certain rooms of a house or apartment). As another example, the systems and methods may be used to track the movement and location of patients in a hospital. For instance, the real time location tracking of patients in a hospital could inform a patient's family of the status of the patient (i.e., whether the patient is in the waiting room, operating room, or recovery room). Another system could help track the movement and location of residents in a nursing home, especially those having dementia or Alzheimer's disease. Notifications could alert nurses and employees when a patient had left an approved area. In still other embodiments, the systems and methods could be used to track the movement and location of children and the elderly and prevent them from entering dangerous areas, such as pools, kitchens, or garages. The systems could also be utilized as a fall detector for the elderly and alert the user when a fall was detected.

The systems and methods described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the systems and methods in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A system for tracking location of a movable asset within a space, comprising:

a tag configured for attachment to the movable asset;

a plurality of anchors configured for measuring location data of the tag within the space, wherein the tag and the anchors each comprise a transceiver module operable to measure location using ultrawide band (UWB);

a listener in communication with a communications portal, the listener configured to receive location data from the anchors and to transmit the location data to the communications portal; and wherein the communications portal comprises software for organizing the location data, software for creating a virtual barrier for the tag, and a screen for displaying the location data and the virtual barrier to a user, and wherein the software for creating the virtual barrier, when executed by a processor, causes the processor to set a point of the virtual barrier at each location in which the user positions the tag and to display the points of the virtual barrier on the screen.

2. The system of claim 1, further comprising a chip configured for attachment to the tag, the chip further configured to send an alert to the movable asset, the user, or both when the tag moves beyond the virtual barrier.

3. The system of claim 1, wherein the anchors are configured to measure location data of the tag based on a time interval.

4. The system of claim 3, wherein the time interval ranges from ten times per second to once per second.

5. The system of claim 1, wherein the communications portal is in wireless communication with a mobile application running on a mobile device of the user.

6. A system for tracking location of a movable asset within a space, comprising:

a tag configured for attachment to the movable asset;

a plurality of anchors configured for measuring location data of the tag within the space, wherein the tag and the anchors each comprise at least one of a transceiver module operable to measure location using ultrawide band (UWB) or a transceiver module operable to measure location using global positioning system (GPS); and a listener in wireless communication with a mobile application running on a mobile device of the user, the listener configured to receive location data from the tag and the anchors and to transmit the location data to the mobile application, wherein the mobile application comprises software for creating a virtual barrier for the tag and the software, when executed by a processor, causes the processor to set a point of the virtual barrier at each location in which a user positions the tag and to display the points of the virtual barrier on the mobile application.

7. The system of claim 6, wherein the anchors are configured to measure the location data of the tag based on a time interval.

8. The system of claim 6, wherein the time interval ranges from ten times per second to once per second.

9. The system of claim 6, wherein the tag and the anchors each comprise the transceiver module operable to measure location using UWB and the transceiver module operable to measure location using GPS.

10. The system of claim 6, wherein the mobile application is incorporated with augmented reality (AR) capabilities configured to perform three-dimensional recognition of the space in which the virtual barrier is to be created.

11. A method for tracking the location of a movable asset within a space, comprising:

providing a tag configured for attachment to the movable asset and a plurality of anchors configured for measuring location data of the tag within the space, wherein the tag and the anchors each comprise at least one of a transceiver module operable to measure location using ultrawide band (UWB) or a transceiver module operable to measure location using global positioning system (GPS);

measuring the location data of the tag using at least one of the transceiver modules;

communicating the measured location data of the tag to a listener, wherein the listener is configured to transmit the measured location data to a mobile application running on a mobile device of the user;

displaying the measured location data of the tag on the mobile application; and creating a virtual barrier for the tag by positioning the tag at a plurality of locations within the space and inputting the locations into the mobile application.

12. The method of claim 11, further comprising detecting movement of the tag beyond the virtual barrier and sending an alert to the user's mobile device.

13. The method of claim 11, wherein the step of measuring further comprises communicating a location of one anchor to another anchor and to the listener such that the plurality of anchors establish a grid pattern having x, y, and z coordinates over the space.

* * * * *